United States Patent
Kuroiwa (10) Patent No.: US 6,724,215 B2
(45) Date of Patent: Apr. 20, 2004

(54) METHOD OF EVALUATING LIQUID CRYSTAL PANEL AND EVALUATING DEVICE

(75) Inventor: Masahiro Kuroiwa, Suwa (JP)

(73) Assignee: Seiko Epson Corporation (JP)

( * ) Notice: Subject to any disclaimer, the term of this patent is extended or adjusted under 35 U.S.C. 154(b) by 0 days.

(21) Appl. No.: 09/990,094

(22) Filed: Nov. 21, 2001

(65) Prior Publication Data

US 2002/0080307 A1 Jun. 27, 2002

(30) Foreign Application Priority Data

Nov. 22, 2000 (JP) .................................. 2000-355947

(51) Int. Cl.[7] .............................................. G01R 31/00
(52) U.S. Cl. ...................................... 324/770; 324/752
(58) Field of Search ............................... 324/770, 158.1, 324/73.1, 765, 750–752; 356/364, 365; 250/306–311; 359/272, 252–253

(56) References Cited

U.S. PATENT DOCUMENTS

| | | | | |
|---|---|---|---|---|
| 5,517,027 A | * | 5/1996 | Nakagawa et al. | ......... 250/306 |
| 5,621,334 A | * | 4/1997 | Urano et al. | ................. 324/770 |
| 5,844,249 A | * | 12/1998 | Takano et al. | ........... 356/237.1 |
| 6,040,909 A | * | 3/2000 | Hasegawa et al. | .......... 356/614 |
| 6,088,115 A | * | 7/2000 | Ohsaki et al. | ............... 356/445 |
| 6,151,116 A | * | 11/2000 | Hirosawa | ..................... 356/369 |
| 6,215,549 B1 | * | 4/2001 | Suzuki et al. | ................ 356/338 |

\* cited by examiner

Primary Examiner—David A. Zanda
Assistant Examiner—Tung X. Nguyen
(74) Attorney, Agent, or Firm—Harness, Dickey & Pierce, P.L.C.

(57) ABSTRACT

A polarizer 25 in a light-incident optical system includes a polarized-light polarization axis 25t parallel to a predetermined direction. As a result of the passage of light through the polarizer 25, linearly polarized light Li including a vibration plane that includes the direction of the polarized-light polarization axis 25t is formed, and is incident upon a liquid crystal panel 10 at an incident angle $\theta i$. On the other hand, a detecting optical system is set so as to detect specularly reflected light formed as a result of the reflection of the linearly polarized light Li that has impinged upon the liquid crystal panel 10 at the incident angle $\theta i$. The specularly reflected light that exits from the liquid crystal panel 10 at an exiting angle $\theta o$ that is substantially equal to the incident angle $\theta i$ is incident upon a polarizer 26, and is eventually guided to a light detector 29. The polarizer 26 includes a polarized-light absorption axis 26a parallel to the polarized-light polarization axis 25t of the polarizer 25, with a light path serving as a reference.

17 Claims, 8 Drawing Sheets

Prior Art

METHOD OF EVALUATING LIQUID CRYSTAL PANEL AND EVALUATING DEVICE

BACKGROUND OF THE INVENTION

1. Technical Field of the Invention

The present invention relates to a method of evaluating a liquid crystal panel, and an evaluating device. More particularly, the present invention relates to a suitable manufacturing technology for finding out the thickness of or the presence or absence of dust in a liquid crystal layer of a reflective liquid crystal panel having a reflective layer formed at the inside surface thereof.

2. Description of the Related Art

In general, a liquid crystal panel is formed by bonding two substrates and injecting liquid crystals between both of these substrates. Electrode patterns for applying a voltage to the liquid crystal layer are formed on the two substrates, respectively. When constructing a liquid crystal display device using this liquid crystal panel, the thickness (the cell gap) of the liquid crystal layer greatly affects the display properties, so that it is very important to set the thickness of the liquid crystal layer with high precision, and to form the liquid crystal layer with uniform thickness throughout the entire panel.

For this reason, in a conventional method of manufacturing a liquid crystal display device, examinations are carried out to evaluate the thickness and the uniformity of the thickness of the liquid crystal layer after forming the liquid crystal panel. Since a display defect occurs when dust contaminates the inside of the liquid crystal layer, an examination as to whether or not there is any dust inside the liquid crystal layer is sometimes carried out.

Here, the above-described examination may, for example, be carried out only to find out whether the manufactured liquid crystal panels are good or defective panels and to eliminate the defective panels, or to obtain the thicknesses and other characteristics values of the liquid crystal layers of the manufactured liquid crystal panels in order to specify the quality level of the liquid crystal panels for classifying them, or to obtain control data for finely adjusting the manufacturing conditions of a manufacturing line as a result of feeding back results. Accordingly, the examination is widely utilized as a way of evaluating liquid crystal panels.

Figure 7:
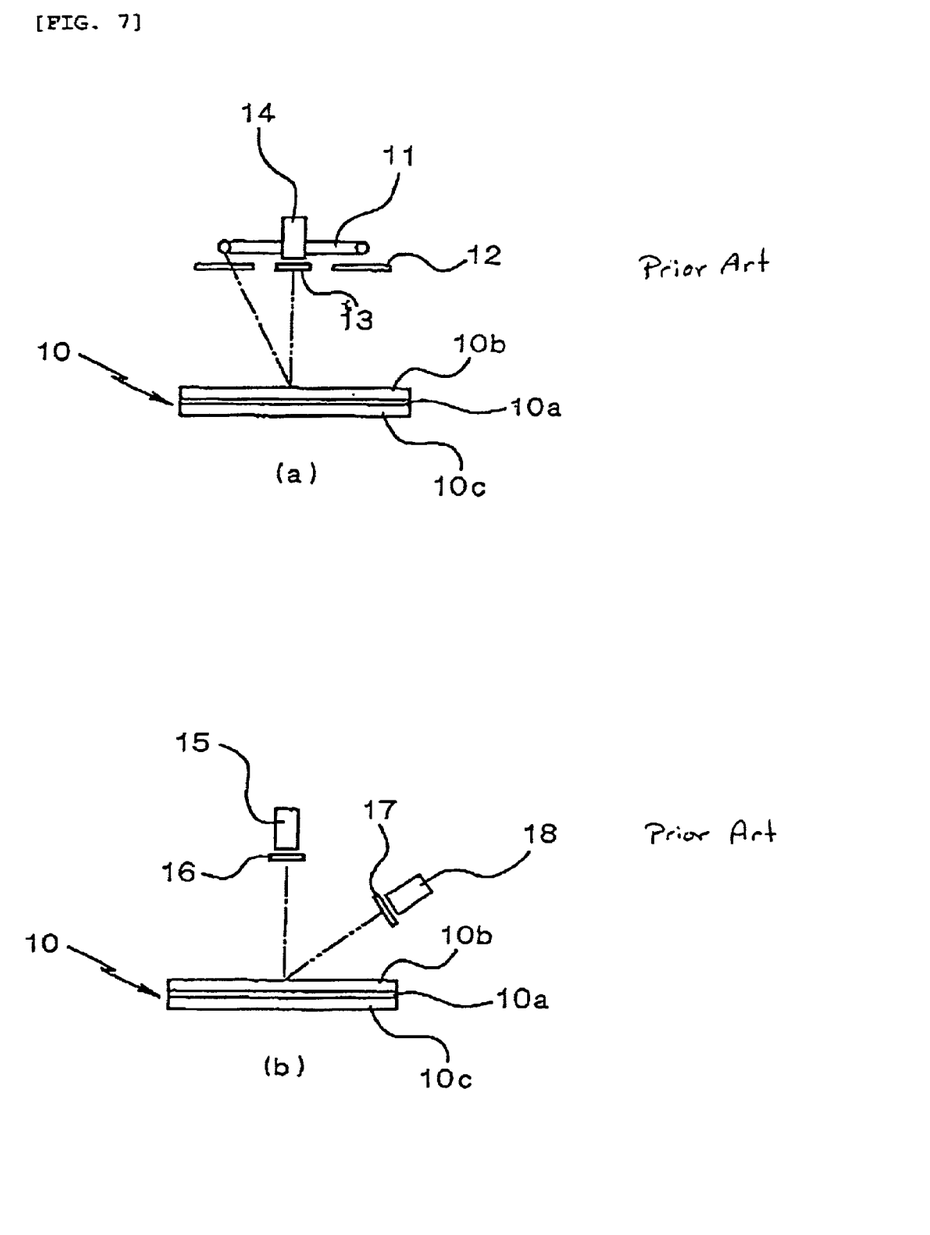
FIGS. 7(a) and 7(b) are schematic views showing examples of structures of conventional evaluating devices for evaluating a liquid crystal panel.

In the conventional method of manufacturing a liquid crystal device, when, as shown in FIG. 7($a$), a liquid crystal panel 10 including a liquid crystal layer 10$a$ is examined, a method may be used in which zonal illumination is carried out using an annular light source 11, light emitted from the light source 11 is converted into linearly polarized light by a polarizer 12, the liquid crystal panel 10 is illuminated by the linearly polarized light, and, through a polarizer 13, reflected light, formed by the reflection of the linearly polarized light, is eventually analyzed by a color photometer 14 (which may be a CCD camera, a photomultiplier, or a spectrometer).

As shown in FIG. 7($b$), there is another method in which light emitted from a light source 15, which can be considered as a point light source, irradiates the liquid crystal panel 10 through a polarizer 16, and reflected light, formed by the reflection of the emitted light, is detected by an obliquely disposed color photometer 18 through a polarizer 17.

In the methods shown in FIG. 7, when the optical axes serve as references, by appropriately setting the relationships between the directions of the polarized-light polarization axes of the light-incident-side polarizers 12 and 16 and the corresponding directions of the polarized-light polarization axes of the light-detection-side polarizers 13 and 17 so that the corresponding directions have angular differences of, for example, 20 to 60 degrees, the hues of the detected light vary in accordance with the thickness of the liquid crystal layer, so that the thickness of and the presence or absence of dust are examined based on the hues of images photographed using the color photometers 14 and 18.

Here, when specularly reflected light, formed by the reflection of the illuminating light incident upon the liquid crystal panel 10, enters these color photometers, specularly reflected light from the interface between the substrates 10$b$ and 10$c$ of the liquid crystal panel 10 reduces the quantity of a reflected-light component of the light obtained after the passage of the light through the liquid crystal layer 10$a$, so that the precision of detection is reduced. Therefore, as shown in FIGS. 7($a$) and 7($b$), while the incident angle of the illuminating light with respect to the liquid crystal panel 10 and the exiting angle of the detection light to be detected by the color photometers 14 and 18 are set differently, reflected light that is not specularly reflected light, that is, diffused light is only detected in order to examine the liquid crystal panel.

However, in the conventional methods of examining a liquid crystal panel, light emitted from the light sources 11 and 15 irradiate the liquid crystal panel 10 after passing through the corresponding polarizers 12 and 16, and the color photometers 14 and 18 receive only diffused light and avoid receiving specularly reflected light, so that the quantity of light incident upon the color photometers 14 and 18 is decreased, and the S/N ratio (signal-to-noise ratio) of the detection signal is low, resulting in the problem that it is difficult to examine the liquid crystal panel with high precision.

In addition, since the reflected light to be detected by the color photometers 14 and 18 is diffused light instead of specularly reflected light, it is thought that the light component of the reflected light obtained as a result of the passage of light through the liquid crystal layer 10$a$ does not necessarily precisely reflect the state of the liquid crystal layer 10$a$, so that, also due to this, the problem that accurate information regarding the liquid crystal layer 10$a$ cannot be detected arises.

Accordingly, in order to overcome the above-described problems, it is an object of the present invention to provide a novel method of evaluating a liquid crystal panel and evaluating device, which make it possible to precisely obtain information regarding a liquid crystal layer other than by the conventional methods.

SUMMARY OF THE INVENTION

In order to overcome the above-described problems, according to the present invention, there is provided a liquid-crystal-panel evaluating method for optically evaluating a liquid crystal panel, wherein polarized light in a predetermined state is made to be incident upon the liquid crystal panel, and a ratio of a polarized component of specularly reflected light, formed as a result of the reflection of the incident light, transmitted through a liquid crystal layer of the liquid crystal panel is increased to form detection light in order to evaluate the panel based on the detection light.

According to the present invention, by causing polarized light in a predetermined state to be incident upon the liquid crystal panel, and increasing the ratio of the polarized component of the specularly reflected light, formed by the reflection of the incident light, transmitted through the liquid crystal layer in order to form detection light, the panel is evaluated based on the detection light. Therefore, by using specularly reflected light, the quantity of the detection light can be increased compared to that provided by the conventional panel evaluating methods, so that it is possible to increase the precision of the detection. In addition, by increasing the polarized component of the specularly reflected light transmitted through the liquid crystal layer, it is possible to reduce the ratio of the specularly reflected light that has exited without passage of the light through the liquid crystal layer, similarly to, for example, the light reflected at the surface of a substrate of the liquid crystal panel, so that a reduction in the detection precision can be restricted.

Here, in the specification of the application, specularly reflected light refers to reflected light having an exiting angle which is substantially equal to the incident angle of the polarized light incident upon the liquid crystal panel. In addition, when the term reflected light is simply used, it refers to specularly reflected light and diffused light that is not specularly reflected light.

There is provided another method which is a liquid-crystal-panel evaluating method for optically evaluating a reflective liquid crystal panel, wherein polarized light in a predetermined state is made to be incident upon the liquid crystal panel, and a ratio of a polarized component of specularly reflected light, formed as a result of the reflection of the incident light, transmitted through a liquid crystal layer of the liquid crystal panel is increased to form detection light in order to evaluate the panel based on the detection light. According to this liquid-crystal-panel evaluating method of the present invention, when a reflective liquid crystal panel is evaluated, a particularly high detection sensitivity can be obtained.

There is provided still another method which is a liquid-crystal-panel evaluating method for optically evaluating a liquid crystal panel, wherein reflecting means is disposed at a back side of a liquid crystal layer of the liquid crystal panel, and wherein polarized light in a predetermined state is made to be incident upon the liquid crystal panel, and a ratio of a polarized component of specularly reflected light, formed as a result of the reflection of the incident light, transmitted through the liquid crystal layer of the liquid crystal panel is increased to form detection light in order to evaluate the panel based on the detection light. Here, the reflecting means may be a reflecting layer or a reflecting plate incorporated inside the liquid crystal panel (including the case where either one of them is disposed on the outside surface of the substrate of the back surface side of the liquid crystal panel); or the reflecting means may be one disposed separately of the liquid crystal panel (such as adjacent to the device). In the latter case, even when the liquid crystal panel is a transmissive or a semi-transmissive liquid crystal panel, it is possible to obtain a high detection sensitivity.

In the present invention, the polarized light is composed almost exclusively of a polarized component including a first vibration plane, and it is preferable that the detection light primarily comprise a component of the specularly reflected light having the polarized component including the first vibration plane eliminated therefrom.

In the present invention, it is preferable that the detection light primarily comprise a polarized component including a second vibration plane that is virtually orthogonal to the first vibration plane, the polarized component including the second vibration plane being extracted from the specularly reflected light.

There is provided still another method which is a liquid-crystal-panel evaluating method for optically evaluating a liquid crystal panel including a liquid crystal layer, wherein linearly polarized light including a first vibration plane is made to be incident upon the liquid crystal panel, and a polarized component of reflected light, formed by reflection of the incident light, including a second vibration plane substantially perpendicular to the first vibration plane is formed as detection light in order to evaluate the panel based on the detection light.

According to the invention, by causing the linearly polarized light including a first vibration plane to be incident upon the liquid crystal panel, and using as detection light the polarized component of the reflected light, formed by the reflection of the incident light, having a second vibration plane (that is substantially orthogonal to the first vibration plane), the specularly reflected light (directly reflected light) from the interface of substrates of the liquid crystal panel is reduced, so that the light whose polarized state has been changed as a result of passage through the liquid crystal layer can be primarily detected. Therefore, the specularly reflected light sent forth from the liquid crystal panel at an exiting angle which is substantially equal to the incident angle is detected in order to make it possible to evaluate the liquid crystal layer of the liquid crystal panel.

In the invention, it is preferable that the thickness of the liquid crystal layer be determined based on the detection light.

In the invention, it is desirable that the thickness of the liquid crystal layer be determined based on the location of a frequency or a wavelength at an extreme value of a spectrum of the detection light. According to this means, since the location of the frequency and the location of the wavelength at an extreme value of the spectrum of the detection light are virtually unaffected by the hue of the detection light, it is possible to measure the thickness of the liquid crystal layer without any trouble even for a liquid crystal panel having a structure that affects a characteristic which is different from the thickness of the liquid crystal panel, or the hue. An example of such a liquid crystal panel is a color liquid crystal panel including a color filter.

In the present invention, it is preferable to examine whether or not there is any dust inside the liquid crystal layer based on the detection light. By detecting the detection light in which the ratio of the light component that has passed through the liquid crystal layer is increased, it is possible to reliably detect any dust inside the liquid crystal layer (including any dust adhered to the inside surfaces of the substrates of the liquid crystal panel).

Next, there is provided a liquid-crystal-panel evaluating device for optically evaluating a liquid crystal panel, which comprises polarizing illumination means for illuminating the liquid crystal panel with polarized light in a predetermined state; detection light obtaining means for receiving specularly reflected light sent forth from the liquid crystal panel and increasing a ratio of a polarized component of the specularly reflected light transmitted through a liquid crystal layer of the liquid crystal panel in order to obtain detection light; and light detecting means for detecting the detection light.

According to the present invention, there is provided another evaluating device which is a liquid-crystal-panel evaluating device for optically evaluating a liquid crystal panel including a liquid crystal layer, which comprises polarizing illumination means for illuminating the liquid crystal panel with linearly polarized light including a first vibration plane; detection light obtaining means for receiving reflected light sent forth from the liquid crystal panel, and removing a polarized component of the reflected light including the first vibration plane in order to obtain detection light; and light detecting means for detecting the detection light.

According to the present invention, there is provided still another method which is a liquid-crystal-panel evaluating method for optically evaluating a liquid crystal panel including a liquid crystal layer, wherein reflecting means is disposed at a back side of the liquid crystal layer, and wherein linearly polarized light including a first vibration plane is made to be incident upon the liquid crystal panel from a front side of the liquid crystal layer, and a polarized component of reflected light, formed by reflection of the incident light, including a second vibration plane substantially orthogonal to the first vibration plane is formed as detection light in order to evaluate the panel based on the detection light. Here, the reflecting means may be a reflecting layer or a reflecting plate incorporated inside the liquid crystal panel (including the case where either one of them is disposed on the outside surface of the substrate on the back surface side of the liquid crystal panel); or the reflecting means may be one disposed separately of the liquid crystal panel (such as adjacent to the device). In the latter case, even when the liquid crystal panel is a transmissive or a semi-transmissive liquid crystal panel, it is possible to obtain a high detection sensitivity.

In the present invention, it is preferable that the polarizing illumination means comprise a light source, and polarizing means for obtaining the polarized light from the light emitted from the light source.

In the present invention, it is preferable that a polarized-light polarization axis of the polarizing means and a polarized-light absorption axis of the detection light obtaining means be substantially orthogonal to each other with reference to an optical axis.

In the present invention, it is preferable that the liquid-crystal-panel evaluating device further comprise means for determining the thickness of the liquid crystal layer based on the detection light.

In the present invention, it is preferable that the means for determining the thickness of the liquid crystal layer derive the thickness of the liquid crystal layer based on the location of a frequency or a wavelength at an extreme value of a spectrum of the detection light.

In the present invention, it is preferable that the liquid-crystal-panel evaluating device further comprise means for showing whether or not there is any dust inside the liquid crystal layer based on the detection light.

DETAILED DESCRIPTION OF THE PREFERRED EMBODIMENTS

A description of embodiments of a method of evaluating a liquid crystal panel and an evaluating device in accordance with the present invention will now be given in detail with reference to the attached drawings.

Figure 1:
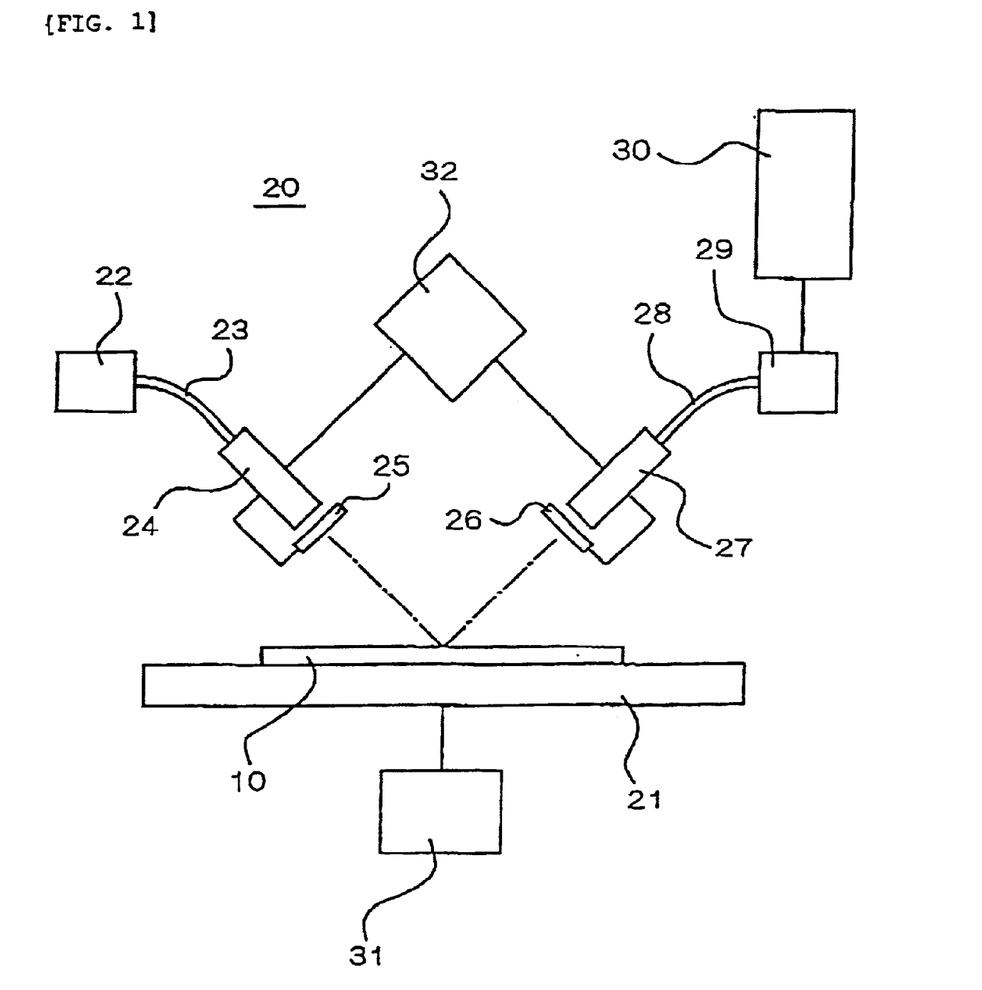
FIG. 1 is a schematic view of the structure of a first embodiment of an evaluating device in accordance with the present invention.

FIG. 1 is a schematic structural view of a first embodiment of an evaluating device used in a method of evaluating a liquid crystal panel in accordance with the present invention.

In an evaluating device 20 of the embodiment, a light-incident optical system is disposed above a base 21 onto which a liquid crystal panel 10 is placed, and comprises a light source 22, such as a halogen lamp, an LED (light-emitting diode), or a CFL (cold-cathode tube); a light-guiding device 23 formed of, for example, optical fiber; a condenser 24, such as a condensing lens, disposed at an end of the light-guiding device 23; and a polarizer 25 used as a polarizer disposed in front of the condenser 24.

A detecting optical system is provided above the base 21 so as to oppose the light-incident optical system, and comprises a polarizer 26 used as a polarizer, a condenser 27, such as a condensing lens, disposed in front of the polarizer 26, a light-guiding device 28, formed of, for example, optical fiber, connected to the condenser 27, and a light-detector 29, such as a spectrometer or a CCD camera, connected to the condenser 28.

The detected data obtained by the light detector 29 is such as to be sent to an evaluation processing section 30. It is preferable that the evaluation processing section 30 be capable of performing a computing operation on the detected data, and more preferable that it be constructed so as to perform a computing operation based on an operation program, like an MPU (microprocessor unit).

The base 21 is constructed so as to be movable, for example, in a direction orthogonal to the plane of the figure sheet by a driving mechanism 31. At least part of the light-incident optical system and the detecting optical system (such as the condenser 24, the polarizer 25, the polarizer 26, and the condenser 27) are constructed so as to be movable, for example, towards the left and right in FIG. 1 by a driving mechanism 32. Therefore, by the driving mechanisms 31 and 32, the light-incident optical system and the detecting optical system, and the liquid crystal panel 10 placed on the base 21 can freely move relative to each other in an imaginary plane parallel to the surface of the liquid crystal panel 10. By constructing at least one of the set of light-incident optical system and the detecting optical system and the base 21 so as to be movable as desired, various driving mechanisms that are functionally equivalent to the driving mechanisms 31 and 32 can be constructed.

Figure 2:
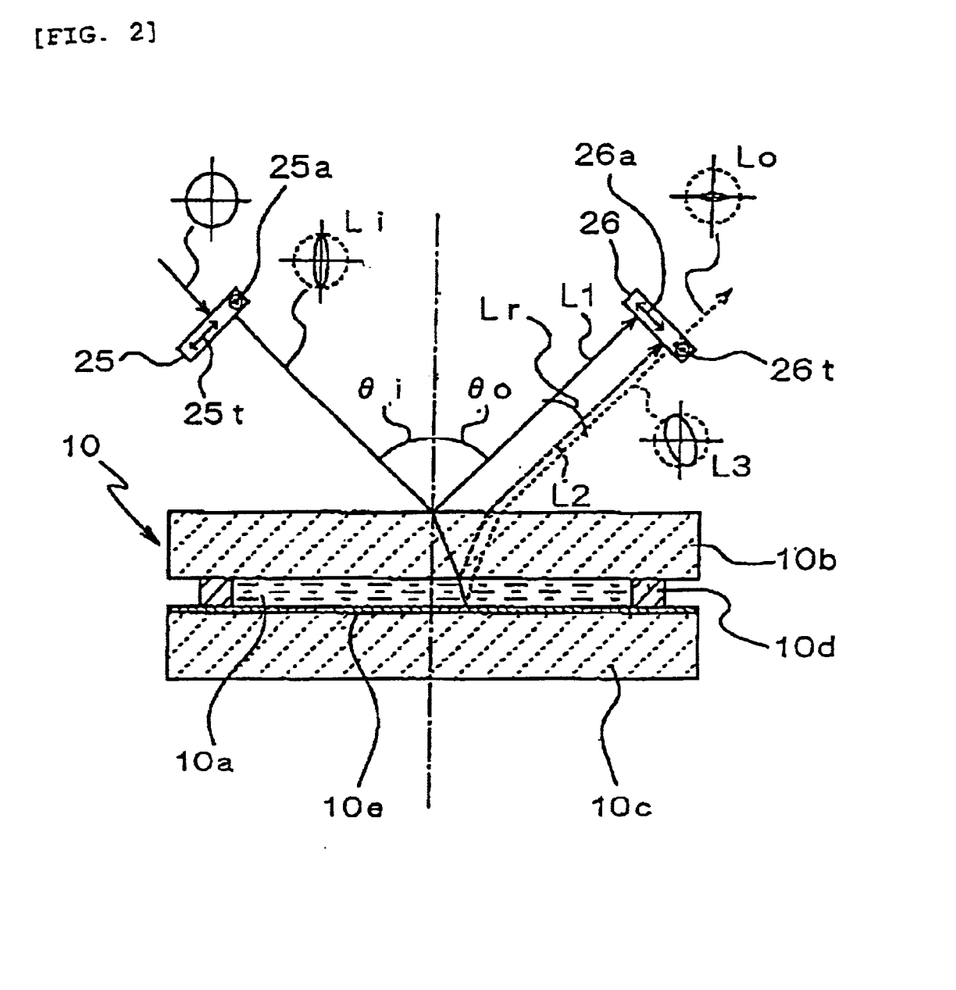
FIG. 2 is an enlarged view used to schematically illustrate the measurement principles in the first embodiment.

FIG. 2 is a schematic view of a light path when the liquid crystal panel 10 is evaluated by the evaluating device 20 of the embodiment. Here, the liquid crystal panel 10 is described as being a reflective liquid crystal panel including substrates 10b and 10c bonded together by a sealant 10d, a liquid crystal layer 10a sandwiched between both of the substrates 10b and 10c, and a reflective layer 10e provided on the inside surface of the substrate 10c.\

In the light-incident optical system, the polarizer 25 includes a polarized-light polarization axis 25t parallel to a predetermined direction (such as a direction P of an intersecting line of a plane including the optical axis of the incident light and the exiting light and a plane orthogonal to an optical axis) and a polarized-light absorption axis 25a parallel to a direction orthogonal to the predetermined direction and the plane orthogonal to the optical axis (such as a direction S orthogonal to the optical axis and the direction P). By passing through the polarizer 25, linearly polarized light Li, including a plane of vibration including the direction of the polarized-light polarization axis 25t, is formed, and is incident upon the liquid crystal panel 10 at an incident angle θi.

On the other hand, the detecting optical system is set so as to detect specularly reflected light formed by the reflection of the linearly polarized light Li incident upon the liquid crystal panel 10 at the incident angle θi, and the specularly reflected light exiting from the liquid crystal panel 10 at an exiting angle θo that is substantially equal to the incident angle θi is incident upon the polarizer 26 and is eventually guided to the light detector 29. The polarizer 26 includes a polarized-light absorption axis 26a disposed in parallel with the polarized-light polarization axis 25t of the polarizer 25 with a light path serving as a reference, and a polarized-light polarization axis 26t disposed orthogonal to the polarized-light polarization axis 25t of the polarizer 25 with the light path serving as a reference.

When the linearly polarized light Li is incident upon the liquid crystal panel 10, a first reflected light beam L1 formed by reflection at the surface of the upper substrate 10b (formed of, for example, glass or plastic) of the liquid crystal panel 10 is generated in accordance with the value of the incident angle θi. Light beams other than the first reflected light beam L1 pass through the substrate 10b and one of them is reflected at a boundary between the substrate 10b and the liquid crystal layer 10a (for example, a boundary between the substrate 10b and an inside surface structure (such as a transparent electrode, a hard protective layer, or an alignment layer, none of which are shown) that is formed on the inside surface of the substrate 10b; or a boundary between the inside surface structure and the liquid crystal layer 10a) in order to form a second reflected light beam L2. The light beam other than the first reflected light beam L1 and the second reflected light beam L2 passes through the liquid crystal layer 10a, and is reflected at an inside surface structure that is formed on the inside surface of the substrate 10c disposed behind the liquid crystal layer 10a and at the reflective layer 10d, forming a portion of the inside surface structure, in order to form a third reflected light beam L3.

In the detecting optical system, the first reflected light beam L1, the second reflected light beam L2, and the third reflected light beam L3 are combined to form an exiting light beam Lr, which is incident upon the polarizer 26. Ordinarily, the first reflected light beam L1 and the second reflected light beam L2 of the light beams that combine to form the exiting light beam Lr are in polarization states that are substantially the same as the polarization state of the linearly polarized light Li incident upon the liquid crystal panel 10, so that they are absorbed by the polarizer 26 having the polarized-light absorption axis 26a. On the other hand, the third reflected light beam L3, formed as a result of the passage of the light through the liquid crystal layer 10a, is in a polarization state (such as an elliptically polarized state) that is different from the initial polarization state of the linearly polarized light Li as a result of a change in the polarization state of the linearly polarized light Li by a predetermined retardation (which is the product of an optical anisotropy $\Delta n$ of liquid crystal molecules inside the liquid crystal layer 10a and a thickness d of the liquid crystal layer 10a) due to the passage of the light through the liquid crystal layer 10a. Therefore, only the third reflected light beam L3 possesses a polarization component which vibrates in the direction of the polarized-light polarization axis 26t of the polarizer 26. The polarization component passes through the polarizer 26 and is detected at the light detector 29 as detection light Lo.

In the embodiment, the first reflected light beam L1 and the second reflected light beam L2, which have been produced by reflection, such as reflection at the interface of the substrate 10b, without passage through the liquid crystal layer 10a are blocked by the polarizer 26, and only the predetermined polarized component of the third reflected light beam L3, formed as a result of the passage of the light through the liquid crystal layer 10a, can be detected. Therefore, it is possible to reduce a component of light not affected by the liquid crystal layer 10a, so that the detection light Lo possesses characteristics (such as light intensity, hue, and spectral distribution) that are strongly dependent upon the polarization state changed by the liquid crystal layer 10a.

The detection light Lo comprises the polarized component of the third reflected light beam L3 without the remaining components of the polarization states that are the same as the first reflection light beam L1 and the second reflection light beam L2, formed without passage of the light through the liquid crystal layer, with the third light beam L3 being produced as a result of the linearly polarized light Li moving to and from the inside of the liquid crystal layer 10a and its polarization state being subjected to optical refraction or double refraction in accordance with the retardation of the liquid crystal layer 10a. As a result, the detection light Lo has a light intensity in accordance with the retardation $\Delta n \cdot d$ of the liquid crystal layer 10a, or a hue and a dispersion spectrum in accordance with the chromatism of the retardation $\Delta n \cdot d$. Therefore, the intensity and the hue or dispersion spectrum of the detection light Lo and the retardation of the liquid crystal layer 10a are mutually related, so that, by theoretically determining this mutual relationship or by determining it experimentally or by simulation, the retardation $\Delta n \cdot d$ of the liquid crystal layer 10a or the thickness d of the liquid crystal layer 10a when $\Delta n$ is already known can be determined, based on the intensity or hue or dispersion spectrum of the detection light Lo.

For example, the intensity of the detection light Lo is increased in accordance with the phase difference of the third reflected light beam.

In addition, the hue of the detection light Lo moves on the degree-of-color diagram in accordance with the variation of the polarization state of the third reflected light beam. Further, the extreme values (the maximum and minimum values) of the dispersion spectrum are such that the frequencies change in accordance with the variation of the polarization state of the third reflected light beam.

Here, the values in incident angle θi=exiting angle θo may be appropriate values equal to or greater than zero degrees to less than 90 degrees. However, since, when the critical angle (the total reflection angle) θth of the linearly polarized light Li with respect to the surface of the substrate 10b is exceeded, the linearly polarized light Li undergoes total reflection at the surface of the substrate 10b, light is not incident upon the liquid crystal layer 10a, so that the actual angle range of the values θi=θo is less than θth. Even in this angle range, the angles are made as large as possible in order to increase the length of the light path inside the liquid crystal layer 10a, as a result of which this is preferable from the point of view of making it possible to increase the detection sensitivity with respect to the liquid crystal layer 10a. However, the intensity, itself, of the detection light Lo is reduced in correspondence with the increased length of the light path inside the liquid crystal panel 10.

In the embodiment, it is possible to increase the intensity of the detection light Lo and the sensitivity than in the conventional devices by making use of specularly reflected light. This makes it possible to make detections without any trouble even when the quantity of light of the light source is reduced, so that the optical systems can be designed with greater freedom, such as constructing an optical system using optical fiber or the like as described above.

Figure 3:
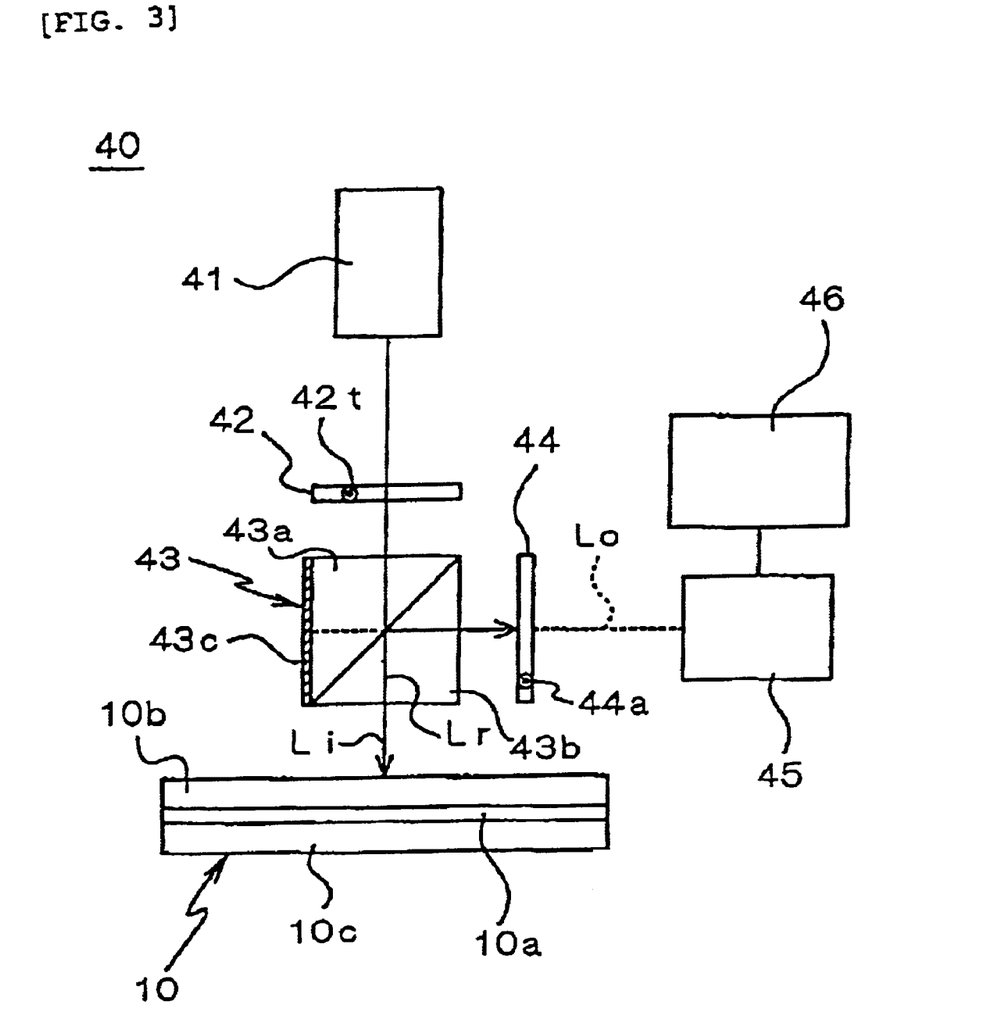
FIG. 3 is a schematic view of the structure of a second embodiment of an evaluating device in accordance with the present invention.

Next, a description of a second embodiment will be given with reference to FIG. 3. Here, the liquid crystal panel 10 to be evaluated is the same as that shown in FIG. 2, so that a description thereof will be omitted.

An evaluating device 40 of the embodiment comprises a light source 41; a polarizer 42 for converting light emitted from the light source 41 into linearly polarized light, a beam splitter 43 for irradiating the liquid crystal panel 10 with the linearly polarized light coming from the polarizer 42, and for vertically refracting the light reflected therefrom; a polarizer 44 for receiving the reflected light refracted by the beam splitter 43; a light detector 45 for detecting the light that has passed through the polarizer 44; and an evaluation processing section 46 for processing detected data obtained by the light detector 45.

In the embodiment, a polarized-light polarization axis 42t of the polarizer 44 is disposed in a direction orthogonal to the plane of the figure sheet, and a polarized-light absorption axis 44a of the polarizer 44 is also set in a direction perpendicular to the figure sheet. The beam splitter 43 comprises prisms 43a and 43b that are placed upon each other, and has a light-shielding layer 43c formed at an end surface thereof at a side opposite to the polarizer 44.

In the embodiment, the light emitted from the light source 41 passes through the polarizer 42, and is converted into linearly polarized light having a vibration plane parallel to the polarized-light polarization axis 42t, and a light beam Li formed as a result of passage of the light through an interface between the prisms 43a and 43b of the beam splitter 43 is incident upon the liquid crystal panel 10. After passing through the liquid crystal layer 10a, the incident light Li is reflected as reflected light Lr that travels back to the beam splitter 43. The light reflected at the interface between the prisms 43a and 43b of the beam splitter 43 is incident upon the polarizer 44, and, here, a polarized component having a vibration plane parallel to the polarized-light absorption axis 44a of the polarizer 44 is absorbed, and the remaining component is detected as detection light Lo by the light detector 45.

In the embodiment, the case where the light-incident angle θi and the light-exiting angle θo are both zero degrees with respect to the liquid crystal panel 10 is described. Here, the reflected light Lr includes a reflected-light component that exits from the liquid crystal panel 10 without passage of the light through the liquid crystal layer 10a, such as due to reflection at the surface of the substrate 10b of the liquid crystal panel 10, and a reflected-light component obtained as a result of the passage of the light through the liquid crystal panel 10a. The reflected-light component that exits from the liquid crystal panel 10 without the passage of the light through the liquid crystal layer 10a is basically, like the incident light Li, a polarized component having a vibration plane orthogonal to the plane of the figure sheet, and is absorbed by the polarizer 44. The reflected-light component obtained as a result of the passage of the light through the liquid crystal layer 10a is such that the polarization state with respect to the linearly polarized component of the incident light Li varies in accordance with the retardation of the liquid crystal layer 10a, so that it may include a polarized component having a vibration plane parallel to the figure sheet. This polarized component passes through the polarizer 44, and is detected by the light detector 45.

In the embodiment, when the optical axis serves as a reference, the polarized-light polarization axis 42t of the polarizer 42 and the polarized-light absorption axis 44a of the polarizer 44 are set in the same direction with respect to the optical axis, so that, even when the specularly reflected light portion of the incident light Li that has irradiated the liquid crystal panel 10 is incorporated as it is into the detecting optical system, the light component obtained after the passage of the light through the liquid crystal layer 10a can be extracted and detected. Therefore, since the intensity of the detection light Lo can be increased, the precision of the detection can be increased. Since the detection light Lo is composed almost exclusively of the light component obtained as a result of the passage of the light through the liquid crystal layer 10a, it is possible to increase the S/N ratio regarding the detection signal.

Figure 4:
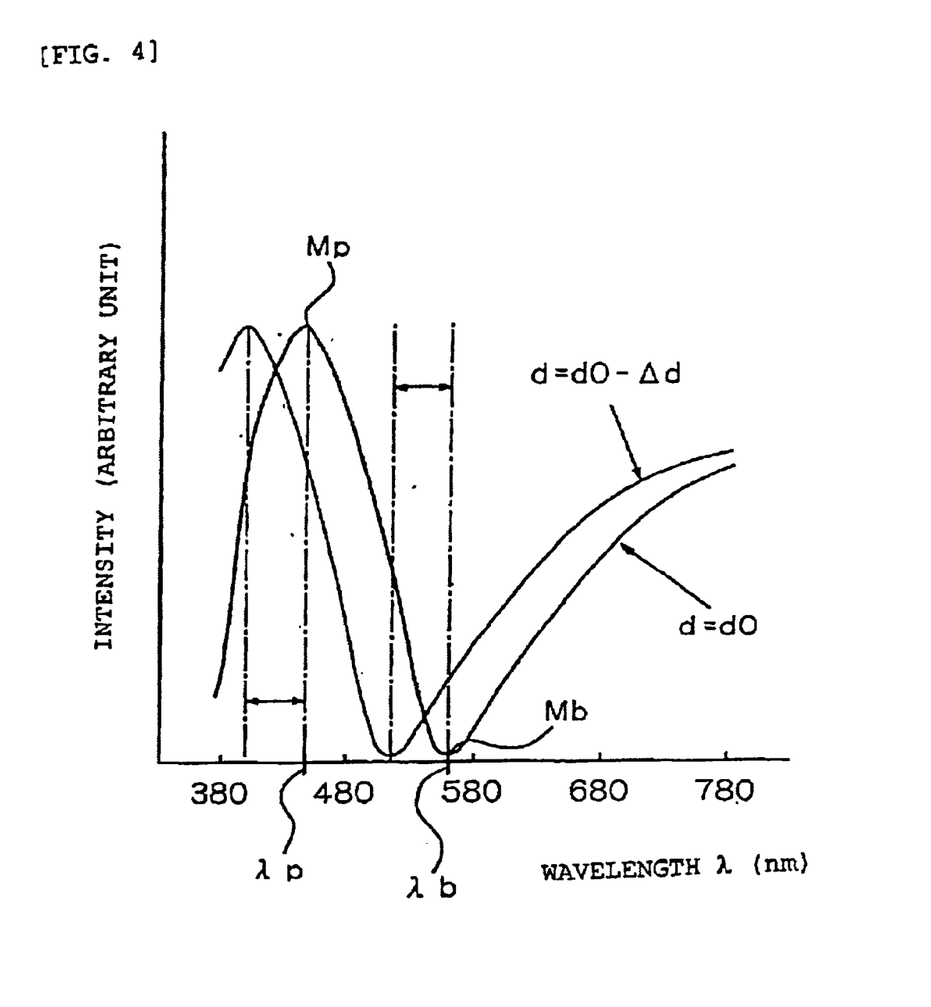
FIG. 4 is a graph showing spectra detected by the evaluating device of the present invention.
Figure 5:
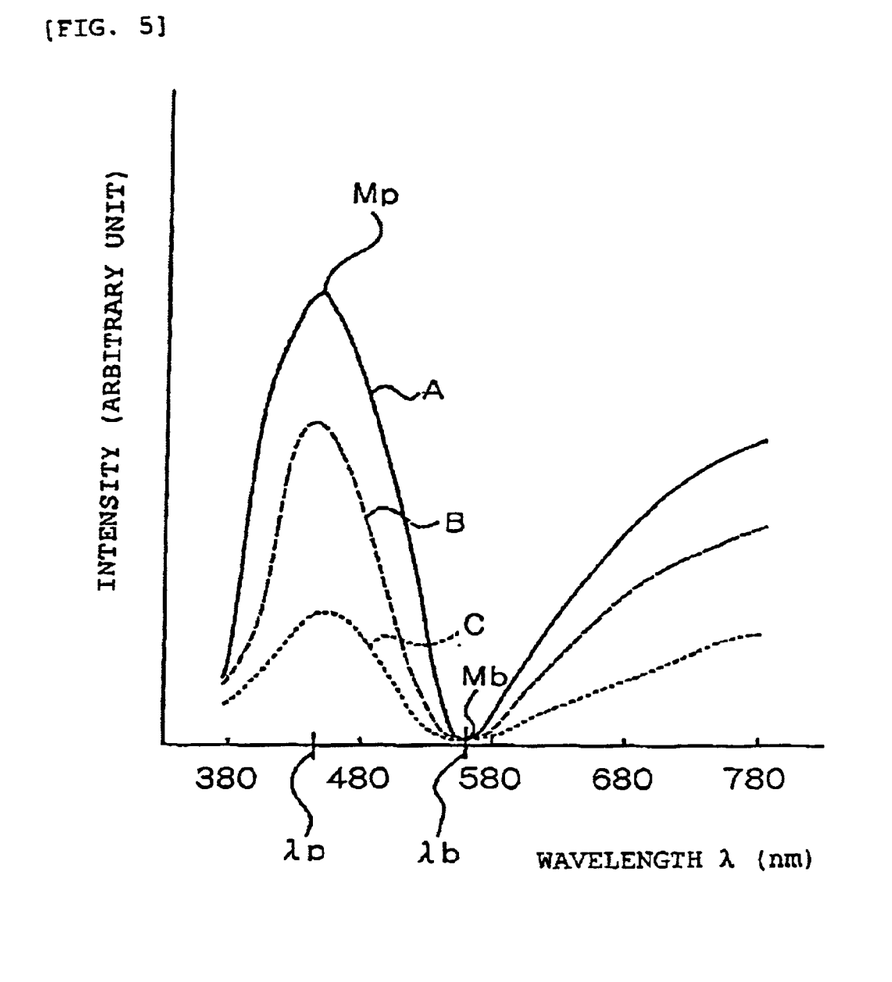
FIG. 5 is a graph showing examples of spectra detected by an evaluating device of the present invention with respect to liquid crystal panels of different conditions such as whether or not a color filter is used.
Figure 6:
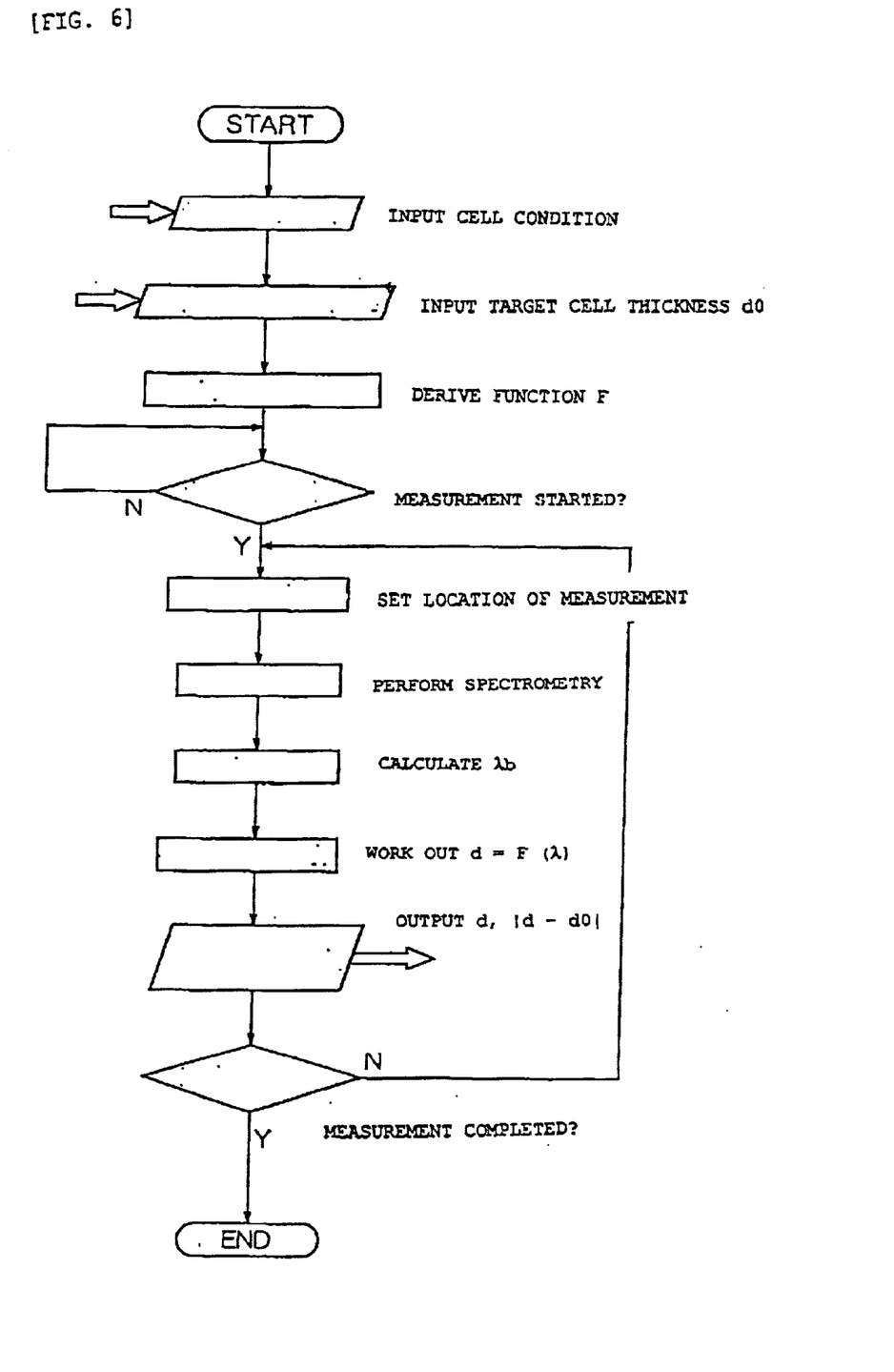
FIG. 6 is a general flowchart showing the outline of an operation program in a third embodiment of an evaluating device in accordance with the present invention.
Figure 8:
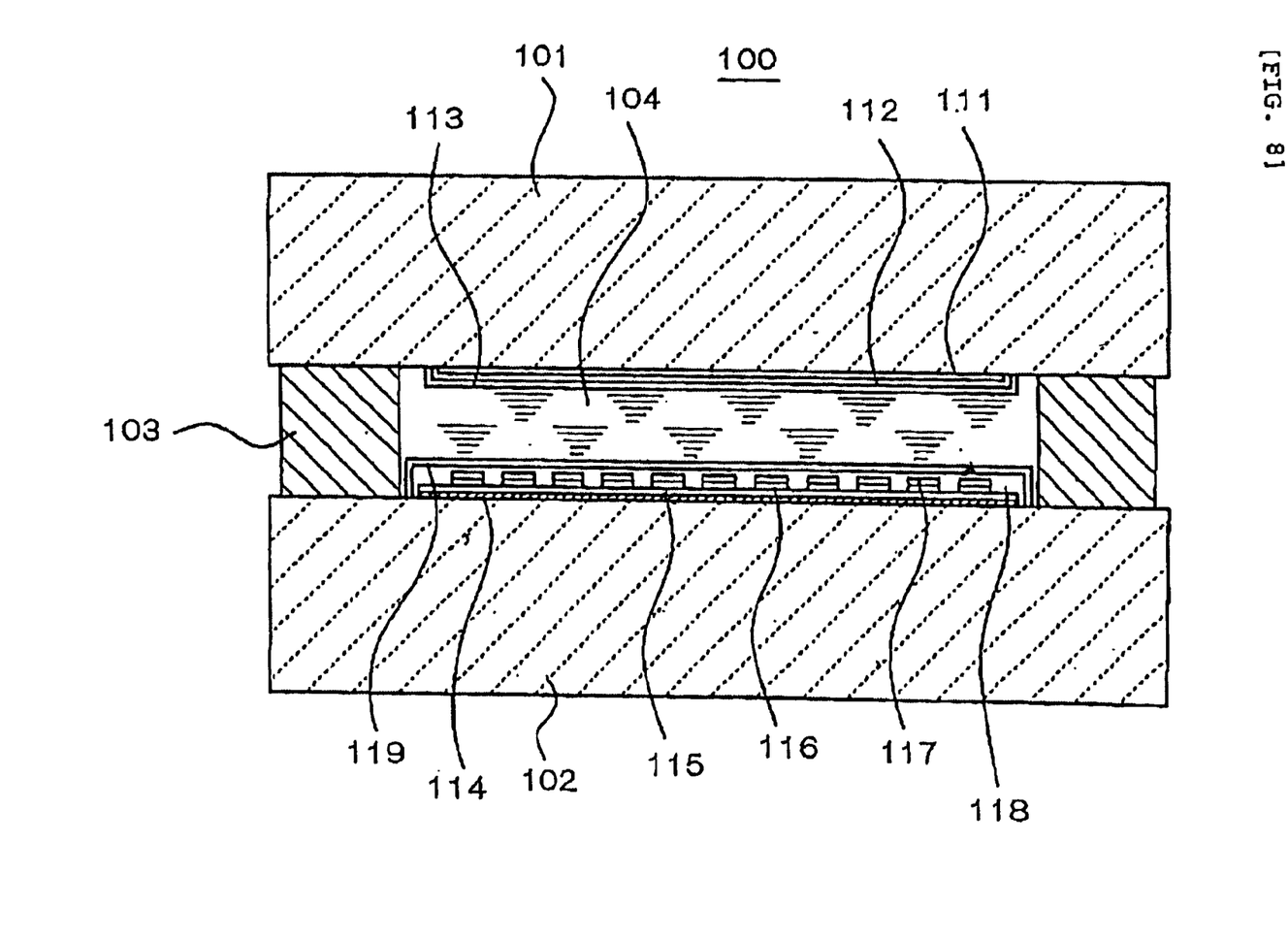
FIG. 8 is a schematic sectional view of the structure of a color reflective liquid crystal panel.

With reference to FIGS. 4 to 6, a description of a third embodiment will be given in which, using an evaluating device having a physical structure similar to that of each of the above-described embodiments, a color reflective liquid crystal panel shown in FIG. 8 is subjected to an evaluating procedure of obtaining a thickness d of a liquid crystal layer 10a from detection light Lo. The general structure of the evaluating device of this embodiment is similar to those of the first and second embodiments, so that it will not be described below.

Referring to FIG. 8, a description of the structure of a color reflective liquid crystal panel 100 to be subjected to measurements using the evaluating device of the embodiment will be given. The liquid crystal panel 100 is a panel formed by bonding substrates 101 and 102 together using a sealant 103, and disposing a liquid crystal layer 104 therebetween. A transparent electrode 111, which is a transparent electrical conductor such as an ITO, is formed on the inside surface of the substrate 101. A hard protective film 112, formed of, for example, $SiO_2$, is formed on the surface of the transparent electrode 111. An alignment film 113 is further formed on the surface of the hard protective film 112 subjected to a rubbing operation.

On the other hand, a reflective layer 114, which is a metallic film formed of, for example, Al, is formed on the inside surface of the substrate 102, and an insulating film 115 is formed on the reflective layer 114. Transparent electrodes 116 are formed on the insulating layer 114. Colored layers 117 are formed on the transparent electrodes 116, with a protective layer 118 for making the surface flat covering the colored layers 117. The colored layers 117 are layers having different color tones (such as red, green, blue) disposed in a proper pattern. The colored layers 117 and the protective layers 118 form color filters. An alignment film 119 is formed on the protective layer 118, with the surface thereof subjected to a rubbing operation.

In the color reflective liquid crystal panel 100 having such a structure, by forming the color filters including the colored layers 117, light that has passed through the liquid crystal layer 104 passes through the color filters, so that it takes on predetermined color tones.

The colored layers 117 have different hues between adjacent pixels, and hue variation and reproducibility are low, so that it is difficult to use the method of obtaining the thickness of the liquid crystal layer using the hue of the detection light Lo. Therefore, in the embodiment, the thickness of the liquid crystal layer 104 is obtained by the method described in detail below.

In the embodiment, a spectroscopic unit is used as the light detector 29 or the light detector 45. The spectroscopic unit can obtain a spectrum of at least the visible range of the detection light Lo or detection data corresponding thereto. For example, a spectrometer using a spectroscopic element, a spectrometer utilizing multiplex spectroscopy, or a multi-channel spectrometer may be used.

In the spectroscopic unit, the spectrum, itself, of the visible range of the light that has arrived along the light path, or various optical parameters (such as complex dielectric constant) that are equivalent to the spectrum or that can be used to derive the spectrum by a predetermined mathematical calculation are detected.

FIG. 4 illustrates an example of spectrums of the detection light Lo. In each spectrum, a minimum value Mb and a maximum value Mp exist in the visible area. A wavelength $\lambda b$ at which the minimum value Mb and a wavelength $\lambda p$ at which the maximum value Mp are obtained are predeterminately correlated with the thickness d of the liquid crystal layer 10a of the liquid crystal display panel 10.

In general, it is possible to derive the spectrum by using the Jones vector method or the 4×4 matrix method based on optical characteristics of the liquid crystal (such as the optical anisotropy $\Delta n$, a twist angle $\theta$, and the thickness d of the liquid crystal layer 10a), an angle $\phi$ (which is 90 degrees in this embodiment) around the optical axis between the polarized-light polarization axes of the polarizers 25 and 42 and between the polarized-light polarization axes of the polarization plates 26 and 44, respectively, the emission spectrum of the light source, and the optical characteristics of the first and second substrates. The locations of the minimum value Mb and maximum value Mp in each spectrum, that is, the wavelengths $\lambda b$ and $\lambda p$ in each spectrum, can be expressed by the above-described parameters. Therefore, when the optical conditions of the light-incident-side optical system and the light-exiting-side optical system are fixed, the thickness d of the liquid crystal layer 10a when the $\Delta n$, $\theta$, and $\phi$ are predetermined values can be expressed by a function $F(\lambda)$ of the wavelength $\lambda b$ or $\lambda p$. Practically, the function $d=F(\lambda)$ that indicates the thickness d can be expressed by a primary to a quartic function of the wavelength $\lambda b$ or wavelength $\lambda p$.

FIG. 4 shows two spectrums when the thickness d of the liquid crystal layer 10a are changed (d=d0, d=d0−$\Delta$d). Ordinarily, when the thickness d of the liquid crystal layer 10a increases, the wavelengths $\lambda b$ and $\lambda p$ of each spectrum of the visible area increase monotonously in accordance with the function $F(\lambda)$. The function $F(\lambda)$ may be an experimental formula determined from data obtained by previously repeating experiments.

FIG. 5 illustrates spectra of the cases where a monochrome panel A not including a color filter, such as that shown in FIG. 2, and color panels B and C including color filters, such as that shown in FIG. 8, are used. Here, the color panels B and C have color filters including colored layers of different hues. In this case, in order to reduce variations in measurements, the light to be separated into its spectral components by the spectroscopic unit is set within a range of passage through an area including a plurality of pixels in the liquid crystal display area.

As shown in FIG. 5, although the spectra greatly change depending upon whether or not a color filter is used, the type of color filter, and the like, the locations of the minimum values Mb and the maximum values Mp virtually do not change, so that the wavelengths $\lambda b$ and the wavelengths $\lambda p$ are virtually constant. Therefore, when the thickness d of the liquid crystal layer is determined using the function $F(\lambda)$, the detected value is virtually unaffected by the presence or absence of a color filter and changes in the filter tones.

FIG. 6 is a general flowchart of the operation program used to operate the evaluation processing sections 30 and 46. When the liquid crystal display panel 10 is set at the evaluating devices, and predetermined data is input from an input device (not shown), such as a keyboard, by an operator or the like, the input data is stored in the memories of the corresponding evaluating processing sections 30 and 46. The input data corresponds to cell conditions, that is, the optical anisotropy $\Delta n$ and the twist angle $\theta$ of the liquid crystal, the angles $\phi$ between the polarization axes of the polarization plates 25 and 42 and between the polarizers 26 and 44, respectively, and the thickness, quality, the optical characteristics, etc., of the panel substrates. The evaluating processing sections receive and record a target value d0 of the thickness d of the liquid crystal layer 10a.

Based on the input cell conditions and the target value, the evaluation processing sections 30 and 46 determine the function $F(\lambda)$. The function $F(\lambda)$ expresses the relationship between the thickness d of the liquid crystal layer 10a and the wavelength $\lambda b$ or the wavelength $\lambda p$. In the embodiment, the wavelength $\lambda b$ which corresponds to the minimum value Mb of each spectrum is used.

Next, when a start command to be input from an external device is waited for, and is input, the measuring portion is set at a proper location in order to start spectral measurement. Then, the evaluation processing sections 30 and 46 receive the spectral data from the spectroscopic unit and determines the wavelengths $\lambda b$ based on the spectral data.

Thereafter, from the wavelengths $\lambda b$, the thickness d of the liquid crystal layer 10a is calculated using the function $F(\lambda)$, and, for example, the calculated thickness d and the difference between it and the target value d0, that is, the difference $\Delta d=|d-d0|$ (the absolute value of the difference between d and d0) are output to the external device (such as a display means or a recording means).

Thereafter, when the portion to be measured is changed in accordance with a previously set measurement pattern, such as when measurements are made on a plurality of portions of the liquid crystal panel 10, the relative positions between the liquid crystal panel 10 and the optical systems are changed by the driving mechanisms in order to similarly repeat the measurements on the different portions to be measured.

In the above-described embodiment, the thickness of the liquid crystal layer of the liquid crystal panel can be detected with high precision virtually without being affected by, for example, whether or not there is a color filter or hue variations.

In the above-described embodiment, although in order to determine the thickness of the liquid crystal layer, the wavelength $\lambda b$ of each spectrum is used, $\lambda p$ may also be used. In addition, a frequency corresponding to the wavelength used or various corresponding values related thereto may be used.

The method of evaluation and the evaluating device of the present invention are not limited to the above-described embodiments, so that various modifications can obviously be made within a range not departing from the gist of the present invention.

For example, although, in each of the above-described embodiments, the method of evaluation is described as being used to evaluate a reflective or a semi-transmissive liquid crystal panel, it may be used for liquid crystal panels other than the reflective type or the semi-transmissive type. Since, even in a transmissive liquid crystal panel, interface reflected light exists after the light has passed through the liquid crystal layer, the liquid crystal layer of the transmissive liquid crystal panel can similarly be evaluated based on the interface reflected light. In this case, a reflecting means, such as a reflecting mirror or a reflecting plate, may be used as an external device. By disposing a reflecting means at the back side of the transmissive liquid crystal panel, it is possible for any one of the evaluating devices to perform evaluations even on the transmissive liquid crystal panel. In evaluating a semi-transmissive liquid crystal panel, by similarly providing a reflecting means as described above, the intensity of the reflected light can be increased, thereby making it possible to provide higher detection sensitivity.

Although in the above-described embodiments the method of evaluation is carried out to determine the thickness of the liquid crystal layer, it may similarly be carried out, for example, to determine the retardation $\Delta n \cdot d$ of the liquid crystal layer, or to determine whether or not there is any dust in the liquid crystal layer. For example, in determining whether or not there is any dust in the liquid crystal layer, the following dust confirmation methods may be used. These methods are the method of visual confirmation of dust based on the formed image as a result of scanning the light irradiation location along the surface of the panel and detecting the detection light Lo at a plurality of locations, and the method of calculating the function $F(\lambda)$ at a plurality of locations and making use of the fact that, when there is dust, the function $F(\lambda)$ varies more greatly than the target value d0.

As can be understood from the foregoing description, it is possible to take out information regarding the liquid crystal layer of the liquid crystal panel with a high S/N ratio, and to evaluate the liquid crystal panel with high precision. The entire disclosure of Japanese Patent Application No. 2000-355947 filed Nov. 22, 2000 is incorporated by reference herein.

What is claimed is:

1. A liquid-crystal-panel evaluating method for optically evaluating a liquid crystal panel comprising:

making polarized light in a predetermined state be incident upon the liquid crystal panel; and increasing a ratio of a polarized component of specularly reflected light, formed as a result of reflection of the incident light, transmitted through a liquid crystal layer of the liquid crystal panel to form detection light in order to evaluate the panel based on the detection light;

wherein the polarized light is composed almost exclusively of a polarized component including a first vibration plane, and the detection light includes a component of the specularly reflected light having the polarized component with the first vibration plane eliminated therefrom, wherein the detection light also includes a polarized component including a second vibration plane that is virtually orthogonal to the first vibration plane, the polarized component including the second vibration plane extracted from the specularly reflected light.

2. The liquid-crystal-panel evaluating method of claim 1 wherein said liquid crystal panel is a reflective liquid crystal panel.

3. The liquid-crystal-panel evaluating method of claim 1 further comprising disposing reflecting means at a back side of the liquid crystal layer of the liquid crystal panel.

4. A method of evaluating a liquid crystal panel according to claim 1, wherein thickness of the liquid crystal layer is determined based on the detection light.

5. A method of evaluating a liquid crystal panel according to claim 4, wherein the thickness of the liquid crystal layer is determined based on a location of a frequency or a wavelength at an extreme value of a spectrum of the detection light.

6. A method of evaluating a liquid crystal panel according to claim 1, wherein whether or not there is any dust inside the liquid crystal layer is examined based on the detection light.

7. A method of manufacturing a liquid crystal display device comprising:

forming a liquid crystal panel by bonding two substrates and injecting liquid crystal therebetween; and evaluating the liquid crystal panel optically by using the liquid-crystal-panel evaluating method according to claim 1.

8. A liquid-crystal-panel evaluating method for optically evaluating a liquid crystal panel including a liquid crystal layer comprising:

making linearly polarized light including a first vibration plane be incident upon the liquid crystal panel;

forming a polarized component of reflected light, formed by reflection of the incident light, including a second vibration plane substantially perpendicular to the first vibration plane, as detection light in order to evaluate the panel based on the detection light; and disposing reflecting means at a back side of the liquid crystal layer, and wherein the linearly polarized light including the first vibration plane is made to be incident upon the liquid crystal panel from a front side of the liquid crystal layer.

9. A method of manufacturing a liquid crystal display device comprising:

forming a liquid crystal panel by bonding two substrates and injecting liquid crystal therebetween; and evaluating the liquid crystal panel optically by using the liquid-crystal-panel evaluating method according to claim 8.

10. A liquid-crystal-panel evaluating device for optically evaluating a liquid crystal panel comprising:

polarizing illumination means for illuminating the liquid crystal panel with polarized light in a predetermined state;

detection light obtaining means for receiving specularly reflected light sent forth from the liquid crystal panel and increasing a ratio of a polarized component of the specularly reflected light transmitted through a liquid crystal layer of the liquid crystal panel in order to obtain detection light; and light detecting means for detecting the detection light;

wherein the polarizing illumination means comprises a light source and polarizing means for obtaining the polarized light from the light emitted from the light source;

wherein a polarized-light polarization axis of the polarizing means and a polarized-light absorption axis of the detection light obtaining means are substantially orthogonal to each other with reference to an optical axis.

11. A liquid-crystal-panel evaluating device according to claim 10, further comprising means for determining thickness of the liquid crystal layer based on the detection light.

12. A liquid-crystal-panel evaluating device according to claim 11, wherein the means for determining the thickness of the liquid crystal layer derives the thickness of the liquid crystal layer based on a location of a frequency or a wavelength at an extreme value of a spectrum of the detection light.

13. A liquid-crystal-panel evaluating device according to claim 10, further comprising means for showing whether or not there is any dust inside the liquid crystal layer based on the detection light.

14. A liquid-crystal-panel evaluating device for optically evaluating a liquid crystal panel including a liquid crystal layer comprising:

polarizing illumination means for illuminating the liquid crystal panel with linearly polarized light including a first vibration plane; detection light obtaining means for receiving reflected light sent forth from the liquid crystal panel, and removing a polarized component of the reflected light including the first vibration plane in order to obtain detection light; and light detecting means for detecting the detection light;

wherein the polarizing illumination means comprises a light source and polarizing means for obtaining the polarized light from the light emitted from the light source wherein a polarized-light polarization axis of the polarizing means and a polarized-light absorption axis of the detection light obtaining means are substantially orthogonal to each other with reference to an optical axis.

15. A liquid-crystal-panel evaluating device according to claim 14, further comprising means for determining thickness of the liquid crystal layer based on the detection light.

16. A liquid-crystal-panel evaluating device according to claim 15, wherein the means for determining the thickness of the liquid crystal layer derives the thickness of the liquid crystal layer based on a location of a frequency or a wavelength at an extreme value of a spectrum of the detection light.

17. A liquid-crystal-panel evaluating device according to claim 14, further comprising means for showing whether or not there is any dust inside the liquid crystal layer based on the detection light.

* * * * *

UNITED STATES PATENT AND TRADEMARK OFFICE
CERTIFICATE OF CORRECTION

PATENT NO.   : 6,724,215 B2
DATED        : April 20, 2004
INVENTOR(S)  : Masahiro Kuroiwa It is certified that error appears in the above-identified patent and that said Letters Patent is hereby corrected as shown below:

<u>Title page,</u>
Item [75], Inventors, delete "Suwa (JP)"; add -- Nagano City (JP) --
Item [56], References Cited, add:

-- FOREIGN PATENT DOCUMENTS

| | | |
|---|---|---|
| 2000-0022934 | April/2000 | Korea |
| 2000-0000875 | Jan/2000 | Korea |
| 2-116703 | May/1990 | Japan -- |

Signed and Sealed this

Sixteenth Day of November, 2004

JON W. DUDAS
*Director of the United States Patent and Trademark Office*